US006738846B1

(12) United States Patent
Slaughter et al.

(10) Patent No.: US 6,738,846 B1
(45) Date of Patent: May 18, 2004

(54) COOPERATIVE PROCESSING OF TASKS IN A MULTI-THREADED COMPUTING SYSTEM

(75) Inventors: Gregory L. Slaughter, Palo Alto, CA (US); Thomas E. Saulpaugh, San Jose, CA (US); Bernard A. Traversat, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 0 days.

(21) Appl. No.: 09/255,935

(22) Filed: Feb. 23, 1999

(51) Int. Cl.[7] .......................... G06F 13/24; G06F 9/00; G06F 9/46; G06F 9/44
(52) U.S. Cl. .................. 710/260; 710/269; 709/108; 709/312; 709/313; 711/147; 712/244
(58) Field of Search ................................. 710/260–269; 709/213–215, 1, 100–108, 310–318; 711/147, 148; 712/244

(56) References Cited

U.S. PATENT DOCUMENTS

| | | | |
|---|---|---|---|
| 5,136,714 A | * 8/1992 | Braudaway et al. | 710/260 |
| 5,649,102 A | * 7/1997 | Yamauchi et al. | 709/213 |
| 5,790,851 A | * 8/1998 | Frank et al. | 709/104 |
| 5,828,880 A | 10/1998 | Hanko | 395/676 |
| 6,038,607 A | * 3/2000 | Hamilton et al. | 709/236 |
| 6,088,044 A | * 7/2000 | Kwok et al. | 345/505 |
| 6,332,180 B1 | * 12/2001 | Kauffman et al. | 711/153 |

FOREIGN PATENT DOCUMENTS

EP    0653705 A    5/1995 ............. G06F/9/46

OTHER PUBLICATIONS

"Synchronization in Portable Device Drivers", Stein J. Ryan, University of Oslo, (SIGOPS), ACM Headquarters, New York, US, Vol 32, No 4, Oct. 4, 1998, pp. 62–69 XP008003621.

Copy of EPC Search Report in Corresponding European Application EP 00 30 1359.

* cited by examiner

*Primary Examiner*—Sumati Lefkowitz
*Assistant Examiner*—Trisha Vu
(74) *Attorney, Agent, or Firm*—Beyer Weaver & Thomas, LLP

(57) ABSTRACT

Methods and apparatus for a cooperative processing of a task in a multi-threaded computing system are disclosed. In one aspect of the invention, a first thread is arranged to receive a task and only partially process the task. During its processing, the first thread stores processing information that is relevant to future processing in a packet that is associated with the task. Upon completing its processing, the first thread designates a second thread as the owner of the packet. After the second thread obtains ownership of the packet it then further processes the task based at least in part upon the processing information stored in the packet by the first thread. With the described arrangement no synchronization primitives are required for the threads to cooperate in processing the task.

17 Claims, 11 Drawing Sheets

COOPERATIVE PROCESSING OF TASKS IN A MULTI-THREADED COMPUTING SYSTEM

BACKGROUND OF THE INVENTION

1. Field of Invention

The invention relates generally to methods and apparatus for cooperative processing of a task using multiple threads in a multi-threaded computing system.

2. Description of Relevant Art

In general, a thread is a sequence of central processing unit (CPU) instructions or programming language statements that may be independently executed. Each thread has its own execution stack on which method activations reside. As will be appreciated by those skilled in the art, when a method is activated with respect to a thread, an activation is "pushed" on the execution stack of the thread. When the method returns or is deactivated, the activation is "popped" from the execution stack. Since an activation of one method may activate another method, an execution stack operates in a first-in-last-out manner.

During the execution of an object-based program, a thread may attempt to execute operations that involve multiple objects. On the other hand, multiple threads may attempt to execute operations that involve a single object. Frequently, only one thread is allowed to invoke one of some number of operations, i.e., synchronized operations, that involve a particular object at any given time. That is, only one thread may be allowed to execute a synchronized operation on a particular object at one time. A synchronized operation, e.g., a synchronized method, is block-structured in that it requires that the thread invoking the method to first synchronize with the object that the method is invoked on, and desynchronize with that object when the method returns. Synchronizing a thread with an object generally entails controlling access to the object using a synchronization primitive before invoking the method.

Since multiple threads must work together on a shared data resource, there must be a mechanism for preventing these threads from destroying data integrity by, for example, writing at the same time to a particular data area. This particular problem has been solved by using synchronization primitives such as locks, mutexes, semaphores, and monitors to control access to shared resources during periods in which allowing a thread to operate on shared resources would be inappropriate. By way of example, in order to prevent more than one thread from operating on an object at any particular time, objects are often provided with locks. The locks are arranged such that only the thread that has possession of the lock for an object is permitted to execute a method on that object.

As previously mentioned, a thread is permitted to execute a synchronized operation on an object if it successfully acquires the lock on the object. While one thread holds the lock on an object, other threads may be allowed to attempt to execute additional synchronization operations on the object, and may execute non-synchronized operations on the object. Thread synchronization is a process by which threads may interact to check the status of objects, whether the objects are locked or unlocked, while allowing only the thread which holds an object lock to execute synchronized operations on the locked object. Thread synchronization also enables threads to obtain and remove object locks.

In recent years significant efforts have been made to facilitate the creation of platform independent software. That is, software that can execute on multiple different platforms (e.g., different types of computer systems), without requiring the software program to be rewritten or customized to operate on specific platforms. By way of example, the Java programming language is designed to facilitate the creation of Java software objects that are platform independent. Platforms that support Java and a number of other programming languages, require native threads to cooperate with platform independent threads.

Since platform independent threads, such as Java, are subject to potentially long delays they are generally not designed to run time critical code. That task is left to native threads since they typically are capable of quickly reacting to and processing tasks where timely completion is important. By way of example, native code is used to process an interrupt asserted by, for example, a serial device whose buffer may overrun if not handled fast enough. If, for example, the serial device interrupt was handled by a Java thread, too much latency would accrue in those situations when the Java thread is held off from running. If the Java thread was held off long enough, the delay in processing the serial device interrupt could potentially cause an device error.

One situation where a Java thread is held off from running is referred to as garbage collection. Typical of a Java Virtual Machine (JVM), garbage collection is a process whereby inactive, or otherwise unneccessary objects and/or threads, are identified, collected, and deactivated. In a typical object based computing system, all platform independent threads are kept from running for at least the duration of the garbage collection process.

An additional problem related to those situations where platform independent and native threads do not cooperate occurs in those situations where a Java thread holds ownership of a synchronization primitive (such as a mutex, lock, semaphore, etc.) just prior to being suspended during, for example, the initiation of garbage collection. In this situation, the Java thread cannot relinquish ownership of the synchronization primitive for at least the duration of garbage collection. Consequently, the native thread cannot obtain ownership of the particular synchronization primitive owned by the Java thread and is thereby prevented accessing a locked resource thereby preventing the native thread from running time critical execution of code during garbage collection.

In view of the foregoing, it should be apparent that improved mechanisms and frameworks for cooperative execution of a task using multiple threads in a multi-threaded computer system would be desirable.

SUMMARY OF THE INVENTION

To achieve the foregoing and other objectives, improved mechanisms for cooperatively processing a task in a multi-threaded computer system are described. In one aspect of the invention, a first thread is arranged to receive a task and only partially process the task. During its processing, the first thread stores processing information that is relevant to future processing in a packet that is associated with the task. Upon completing its processing, the first thread designates a second thread as the owner of the packet. After the second thread obtains ownership of the packet it then further processes the task based at least in part upon the processing information stored in the packet by the first thread. With the described arrangement no synchronization primitives are required for the threads to cooperate in processing the task.

In some embodiments, additional threads also participate in the cooperative processing of the task. By way of example, in an embodiment having three threads that cooperatively process the task, the second thread stores additional processing information in the packet and designates a third thread as the owner of the packet upon completion of its processing. The third thread then further processes the task after it obtains ownership of the packet, based at least in part upon the processing information stored in the packet by the second thread.

In some preferred embodiments, designating ownership of the packet is accomplished by updating an ownership field included in the packet. In this arrangement, each thread that participates in the processing of the task sets the ownership of the packet to the next thread to process the task and the final thread to process the task sets the ownership of the packet to no owner.

In a described embodiment, the task is interrupt handling, the threads execute different order interrupt handlers and the packet is an interrupt packet.

In another aspect of the invention an improved interrupt handling system is described. The interrupt handling system includes an interrupt packet and an interrupt handler that is divided into a plurality of different order interrupt handling components. The interrupt handling components are arranged to cooperatively process an interrupt in a serial fashion. An interrupt packet that is accessible by the plurality of different order interrupt handling components and is arranged to pass processing information between interrupt handling components.

In some embodiments, the interrupt packet includes an owner field arranged to store data indicative of the interrupt handling component that currently owns the interrupt packet.

BRIEF DESCRIPTION OF THE DRAWINGS

The invention, together with further advantages thereof, may best be understood by reference to the following description taken in conjunction with the accompanying drawings.

DETAILED DESCRIPTION OF THE EMBODIMENTS

In the following description frameworks and methods of cooperatively processing a task by multiple threads in a multi-threaded computer system are described. In general, upon receipt of a packet associated with the task, a first thread partially processes the task. The packet is then passed from the first thread to a second thread that, upon receipt of the packet, further processes the task. Since only the thread currently possessing the packet can process the task, no synchronization primitives, such as mutexes, are required for the threads to cooperate with each other.

The invention will initially be described in terms of an interrupt handler for a device driver. The interrupt handler itself is conceptually divided into a plurality of different order handlers. The tasks that are to be handled by the interrupt handler are also divided into various segments with each order interrupt handler being designed to handle an associated segment of the overall task. The tasks can conceptually be organized in any appropriate manner, however, in the context of an interrupt handler it is typically most logical to divide the activities by their relative priority. More specifically, it should be appreciated that some of the activities performed by an interrupt handler may be very time critical and must be handled as quickly as possible, while other tasks are not particularly time critical and may effectively be handled on a less time critical basis. The various order handlers are arranged to partition the work performed by the interrupt handler such that the most time critical activities are handled by the order-1 interrupt handler. Less time critical, but still high priority tasks are handled by the order-2 interrupt handler. The least time critical tasks are handled by the order-3 handler. Of course, a task could readily be broken into more or less segments based on the nature of the task being handled.

In the described embodiment, the order-1 interrupt handler is designed to perform tasks that are deemed to require the use of a micro-kernal thread. These are generally the tasks that are considered to be the most time critical. The order-2 interrupt handler is designed to perform tasks that are deemed to require the use of a high priority system thread (higher than a non-native thread and any other system thread). Thus, tasks that are considered to be very important, but not as time critical as the order-1 tasks are handled by the order-2 interrupt handler. The order-3 interrupt handler is arranged to run non-native threads and to perform the tasks that are not particularly time critical.

Figure 1:
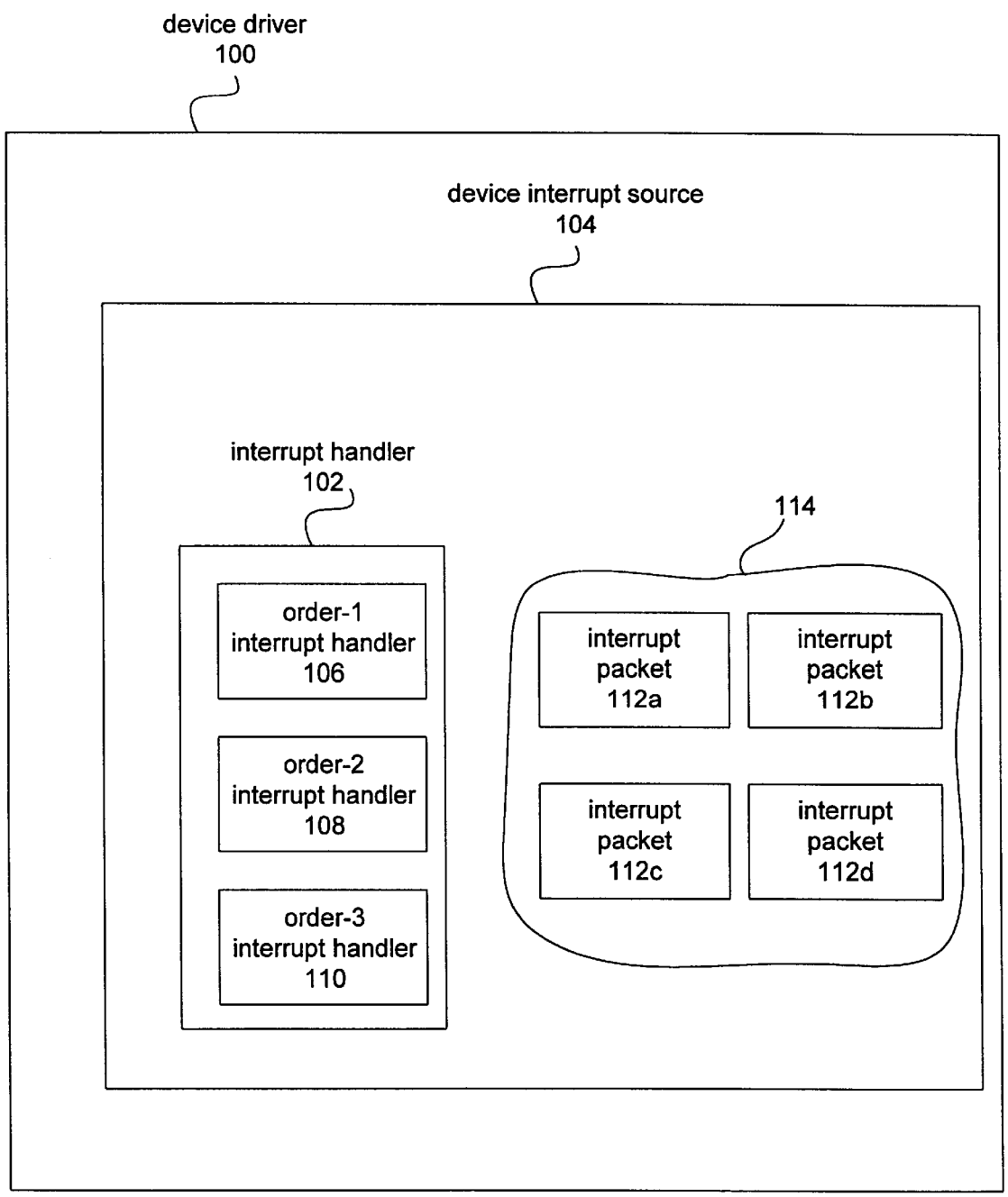
FIG. 1 illustrates a device driver in accordance with an embodiment of the invention.

FIG. 1 illustrates a device driver 100 that may benefit from cooperative task processing performed in accordance with an embodiment of the invention. As will be appreciated by those skilled in the art, a device driver is a program written to support an associated device. In computer systems, devices supported by a device driver may include, but are not limited to input and output devices such as printers, monitors, modems and/or network/telephone connections. The device driver 100 illustrated in FIG. 1 includes an interrupt handler 102 arranged to process hardware interrupts generated by the device that the device driver 100 is managing. The interrupt handler is partitioned into a plurality of sub-parts, including an order-1 interrupt handler 106, an order-2 interrupt handler 108, and an order-3 interrupt handler 110. In alternative embodiments, any combination of these and other orders may be defined for a particular interrupt handler. In the illustrated embodiment, A device interrupt source 104 is provided which defines the particular interrupt handlers used by and associated with the device driver 100, such as, for example, the interrupt handler 102.

Figure 2:
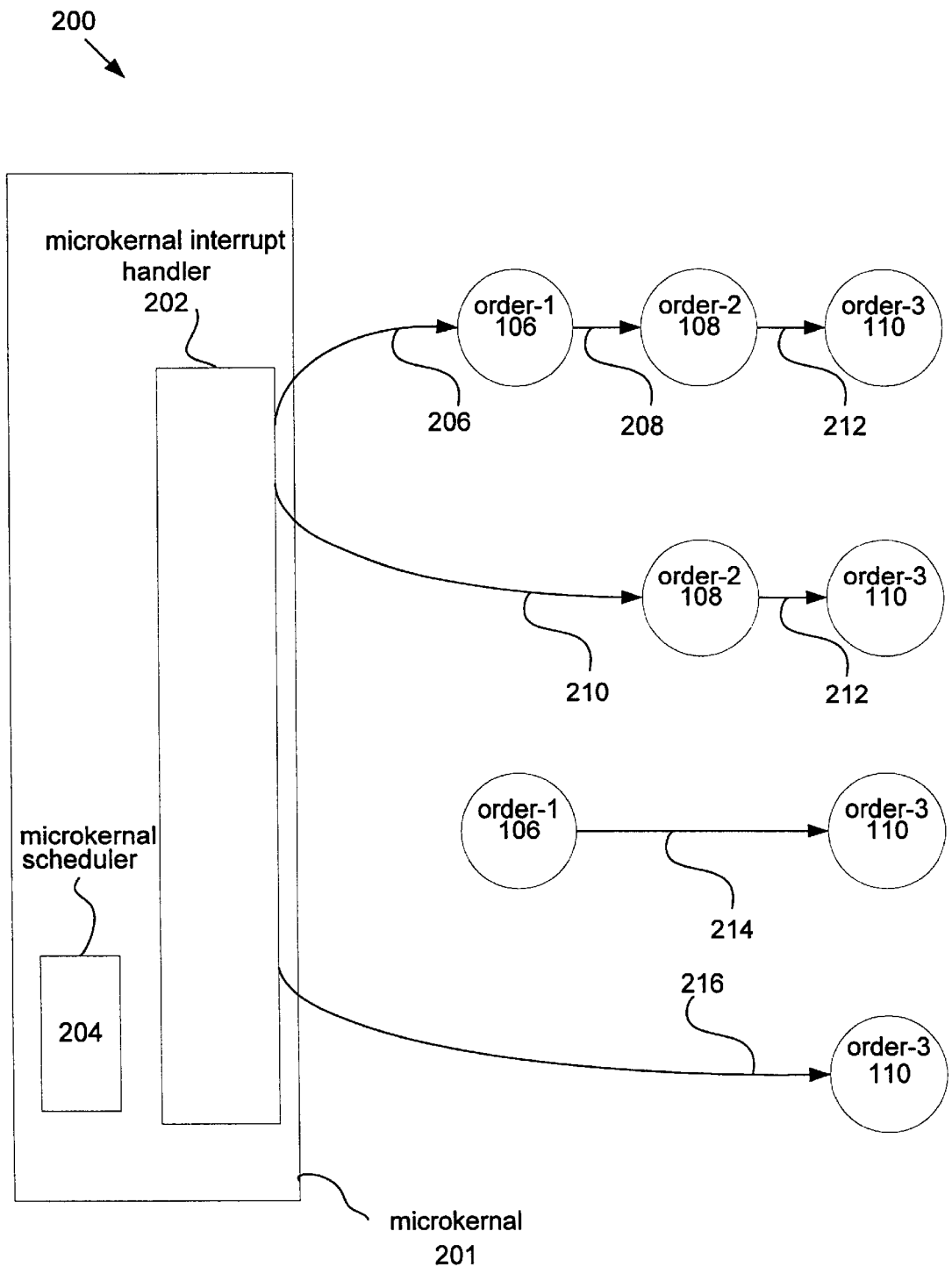
FIG. 2 illustrates a particular relationship between interrupt handlers defined by the device interrupt source object in accordance with an embodiment of the invention.

FIG. 2 illustrates a particular relationship 200 between the various interrupt handlers defined by the device interrupt source 104 in accordance with an embodiment of the invention. In the described embodiment, the order-1 interrupt handler 106 is invoked at 206 in the context of a microkernel interrupt handler 202 included in a microkernel 201 well known by those skilled in the art. The microkernel interrupt handler 202 is software that immediately begins running whenever hardware coupled to the microkernel 201 asserts an interrupt. It is important to note, however, that once the microkernel interrupt handler 202 begins to run, any thread that is currently running in the multi-threaded computer system is immediately suspended. It should also be noted, that once the microkernel interrupt handler 202 returns, a microkernel scheduler 204 (i.e., software used to schedule prioritized threads) un-suspends the highest priority thread even though that thread may or may not be the thread that was interrupted. In one embodiment, the order-1 handler 206 runs native code (i.e., platform dependent code) and subsequently fulfills the most immediate needs of the interrupting device such as, for example, when the interrupting device is a serial device whose buffer may overrun if not handled fast enough.

It should be noted that while the order-1 handler 106 is running, all further interrupts from the interrupting device are masked. After the microkernel interrupt handler 202 calls the order-1 interrupt handler 106 and the order-1 interrupt handler 106 returns (if it is the lowest order handler), or after the microkernel interrupt handler 202 signals the order-2 interrupt handler 108 or order-3 interrupt handler 110 (whichever is lowest), the microkernel interrupt handler 202 transfers control to the microkernel scheduler 204.

All hardware interrupts are for a particular level, and a higher hardware level will pre-empt an interrupt currently being processed at a lower level. For example, if an order-1 interrupt handler is currently running for a level-3 hardware interrupt, and an interrupt for a level 4 occurs, that level 4 interrupt will pre-empt the order-1 handler running for the level-3 interrupt.

In addition, the running order-1 interrupt handler 106 also preempts other order-1 interrupt handlers coupled to the microkernel 201 that were invoked by the lower-level microkernel interrupt handler 202 as well as any non-native threads (i.e., platform independent threads such as Java threads). It is for at least this reason that the order-1 interrupt handler 106 should do the absolute minimum that is necessary to satisfy the most immediate needs of the interrupting device and leave the remainder of interrupt handling for higher-order interrupt handlers (such as the order-2 and order-3 interrupt handlers). It is important to note that in those situations where non-native threads, such as Java, are suspended during, for example, garbage collection, the order-1 interrupt handler 106 is still capable of running. In this way, time critical processes are still capable of being run.

In the described embodiment, the order-2 interrupt handler 108 is, in some cases, signaled from the order-1 interrupt handler at 208. In those cases where no order-1 interrupt handler exists, the order-2 interrupt handler 108 is signaled from the microkernel interrupt handler 202 at 210. In a preferred embodiment, the order-2 108 handler runs native code in a high priority system thread (higher than a non-native thread and any other system thread) and performs additional interrupt handling. Since the order-2 interrupt handler 108 runs native code (platform dependent), and since it has higher priority than any other non-native thread, the order-2 interrupt handler 108 can handle real time needs of the interrupting device. At the same time, unlike the order-1 interrupt handler 106, the order-2 interrupt handler 108 can continue interrupt processing without masking additional interrupts from the interrupting device. An interrupt can still occur, and the order-1 interrupt handler 106 can run while the order-2 interrupt handler 108 is in the middle of interrupt handling. Once the order-2 interrupt handler 108 finishes its interrupt handling, it signals the order-3 interrupt handler 110 at 212. It is important to note that the order-2 interrupt handler 108 should be able to run while the non-native threads are suspended during, for example, garbage collection.

In addition to the order-1 interrupt handler 106 and the order-2 interrupt handler 108, the device interrupt source 104 is arranged to define the order-3 interrupt handler 110. The order-3 interrupt handler 110 is signaled to run from either the order-2 interrupt handler 108 or the order-1 interrupt handler 106 at 214 in the case where there is no order-2 interrupt handler. However, if there is neither an order-1 interrupt handler nor an order-2 handler present, the signaling can come from the microkernel interrupt handler 202 directly at 216.

It is important to note that in the described embodiment, the order-3 interrupt handler 110 runs non-native code, such as Java, exclusively and for this reason can be especially slow when it is pre-empted for long periods such as when the non-native threads are suspended. For this reason, the order-3 interrupt handler 110 should not be used for time critical interrupt processing. In addition, since the order-3 interrupt handler 110 is the only interrupt handler capable of running non-native code, such as Java, the device interrupt source 104 must define the interrupt handler 104, as a minimum, to include the order-3 interrupt handler 110 in those situations where non-native threads are contemplated.

Typically, the number and type of interrupt handlers defined by the device interrupt source 104 is determined by the particular application as well as the number and type of hardware devices. In those situations where the delay experienced by native threads when non-native threads are suspended is not significant or doesn't cause significant system performance problems, the device interrupt source 104 may find it necessary to only allocate the order-3 interrupt handler 110. On the other hand, in those situations where it is imperative that native threads be left to run substantially unhindered (even though non-native threads are suspended for reasons such as garbage collection) it is important to allocate more of the lower order interrupt handlers. By way of example, the device interrupt source 104 can allocate relatively more of the order-1 interrupt handlers 106 and/or the order-2 interrupt handlers 108 in than of the order-3 handlers 110 when running time critical processes without substantial hindrance is important.

Referring again to FIG. 1, in one embodiment of the invention, when the device interrupt source 104 is instantiated, an interrupt packet 112 is allocated. In the described embodiment, the actual number of interrupt packets 112 is determined by the device driver 100 based upon particular requirements of the device being managed. It should be noted that based upon these requirements, the device interrupt source 104 can allocate a pool of interrupt packets 114 represented by interrupt packets 112*a*–112*d*.

Figure 3A:
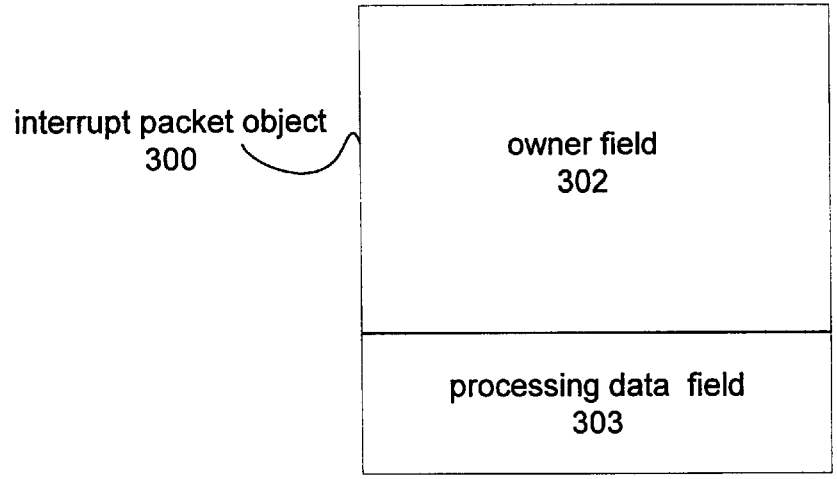
FIGS. 3A and 3B illustrates different aspects of an interrupt packet in accordance with an embodiment of the invention.
Figure 3B:
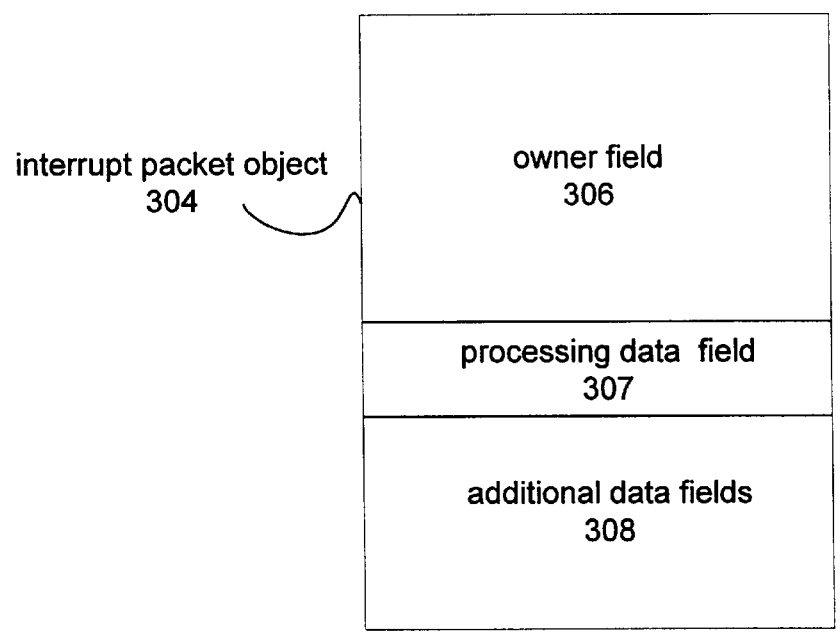

FIGS. 3A and 3B illustrates different aspects of an interrupt packet 300 in accordance with an embodiment of the invention. It should be noted that the interrupt packet 300 is one particular implementation of the interrupt packet 112. In a preferred embodiment, the interrupt packet 300 contains a protected owner field 302 that takes on a value indicative of current ownership of the interrupt packet 300. The interrupt packet 300 also includes a processing data field 303 used to store relevant task processing information.

Table 1 lists representative owner field values and associated ownership status according to one embodiment of the invention.

TABLE 1

| Owner Field Value | Status |
| --- | --- |
| 0 | free (not currently owned by any interrupt handler) |
| 1 | owned by the order-1 interrupt handler |
| 2 | owned by the order-2 interrupt handler |
| 3 | owned by the order-3 interrupt handler |

By way of example, if the owner field 302 has a value of "0", as indicated by Table 1, the interrupt packet 300 is un-owned (i.e., no interrupt handler currently owns the interrupt packet 302). Alternatively, if the owner field 302 has a value of "1", as indicated by Table 1, the interrupt packet 300 is owned by the order-1 handler 106. It should be noted that, in a preferred embodiment, when the device interrupt source object 102 is instantiated, all corresponding interrupt packets 112a–112d are allocated with their respective owner fields set to 0 indicating that no interrupt handler currently owns the particular interrupt packet.

In the described embodiment, the interrupt packet 300 can be extended to include information in addition to the current owner. By extended, it is meant that additional data fields containing information specific to the particular device the associated device driver manages for example, are added. By way of example, the interrupt packet 300 can be extended to include additional data fields associated with, for example, financial data particularly useful for specific financial applications and associated devices. Such an interrupt packet 304 is shown in FIG. 3B. The interrupt packet 304 includes an owner field 306 and a processing data field 307. For this example, the interrupt packet 304 has been extended to include additional data fields 308 used, for example, in defining particular application specific data depending upon the particular native application for which the additional data fields 308 are associated.

It is important to note that since the native operating system only interacts with the owner field, the presence of additional data fields in the extended interrupt packet 304 is irrelevant to the execution of the native operating system. It is for at least this reason, that any extension of an interrupt packet by a particular application leaves the interrupt packet platform independent.

Since the order-1, order-2, and order-3 interrupt handlers for a particular device driver can handle interrupts concurrently it is necessary to avoid any synchronization problems. Such problems caused by, for example, garbage collection result in native threads being suspended. In one embodiment of the invention, such synchronization problems are avoided by using an efficient message passing approach. In a preferred embodiment, the efficient message passing utilizes the interrupt packets 112 provided by the device interrupt source 104. During operation, when an interrupt handler (of any order) exclusively processes an interrupt, it stores processing information relevant to the interrupt processing in the interrupt packet 112. When a particular interrupt handler has completed its processing of the interrupt and is ready to hand the processing off to a higher order interrupt handler (i.e., from the order-1 interrupt handler 106 to the order-2 interrupt handler 108, for example), the lower order interrupt handler passes the interrupt packet to the higher order interrupt handler. The higher order handler then appropriately updates the interrupt packet and continues to process the interrupt. Since no two interrupt handlers possess the same interrupt packet at the same time, synchronization is unnecessary.

Figure 4A:
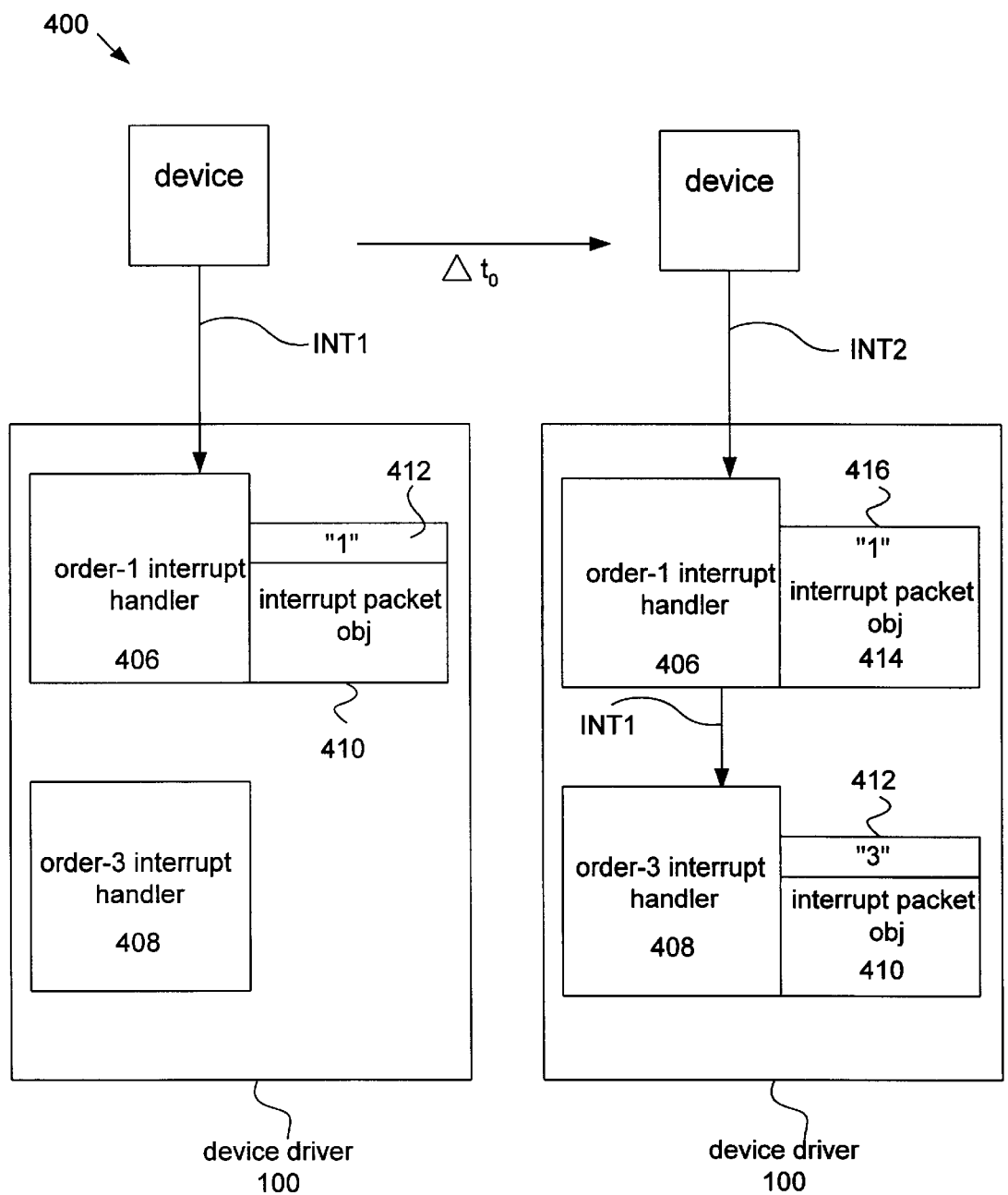
FIG. 4A illustrates a message passing scheme between interrupt handlers in accordance with an embodiment of the invention.

By way of example, FIG. 4A illustrates a scheme 400 for cooperatively processing an interrupt in accordance with an embodiment of the invention. For this example, the device driver 100 includes an order-1 interrupt handler 406 as well as an order-3 interrupt handler 408 (required to run non-native code) instantiated by the device interrupt source 104. When the interrupt INT1 is asserted, the microkernal handler 202 suspends all native threads until such time as it sends an interrupt packet 410 to the order-1 interrupt handler 406. It should be noted that while in possession of the microkernal handler 202, the owner field 412 of the interrupt packet 410 has a value of "0" indicating that it is un-owned.

Once the microkernal handler 202 has sent the interrupt packet 410 to the order-1 interrupt handler 406, the owner field 412 of the interrupt packet 410 is updated to a value of "1" indicating that it is now owned by the order-1 handler 406. Since the order-1 interrupt handler 406 currently owns the interrupt packet 410, it is now the only interrupt handler included in the device driver 100 enabled to process the interrupt INT1. It should be noted as well, that any additional interrupts asserted while the order-1 interrupt handler 406 is processing the interrupt INT1 are masked until such time as the interrupt packet 410 is passed along to a higher order interrupt handler. In this case, even if the non-native code is suspended, the order-1 interrupt handler 406 is still able to process time critical native threads since it alone owns the interrupt packet 410.

Assuming at a time $\Delta t_0$ subsequent to the completion of either order-1 interrupt handling (if there is one) or signaling of what is otherwise the lowest order interrupt handler of the interrupt INT1 another interrupt INT2 is asserted. As described above, the interrupt INT2 is masked until the order-1 interrupt handler 406 sends the interrupt packet 410 to a higher order interrupt handler, such as the order-3 interrupt handler 408. Therefor, in order for the order-1 interrupt handler 406 to process the interrupt INT2, it must send the interrupt packet 410 to the order-3 interrupt handler 408.

Once the order-1 interrupt handler 406 sends the interrupt packet 410 to the order-3 interrupt handler 408, it gets a new interrupt packet 414 from the microkernal interrupt handler 202 in order to process the newly asserted (and heretofore masked) interrupt INT2.

It should be noted that the owner field 412 of the interrupt packet 410 has been updated to a value of "3" indicating that it is now owned by the order-3 interrupt handler and that the owner field 416 of the interrupt packet 414 is updated to a value of "1". In this configuration, the remainder of the interrupt INT1 can be processed by the order-3 interrupt handler 408 concurrently with the interrupt INT2 being processed by the order-1 interrupt handler 406. If an occasion arises where the order-3 interrupt handler is suspended for any reason unrelated to the native operating system, time critical native threads can still be processed by the order-1 interrupt handler 406 after it has completed its processing of the interrupt INT2.

Figure 4B:
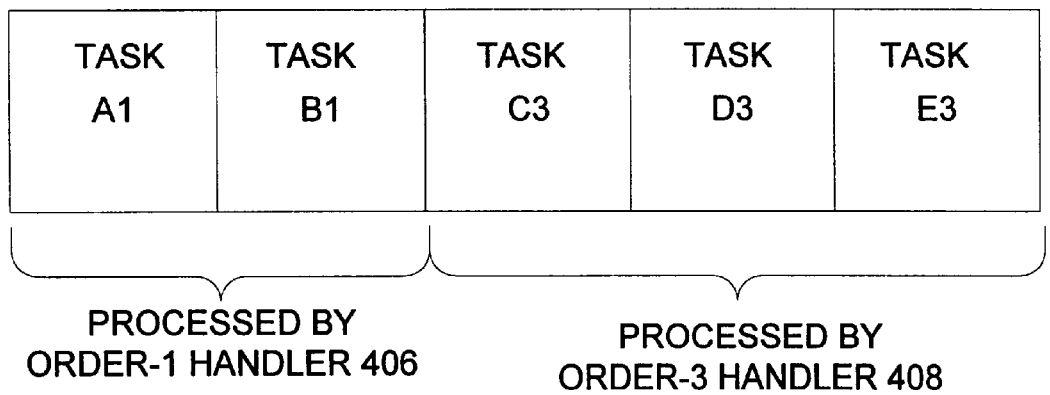
FIG. 4B illustrates processing of the interrupt INT1 shown in FIG. 4A.

FIG. 4B illustrates processing of the interrupt INT1 shown in FIG. 4A. For this example, the interrupt INT1 includes a series of tasks identified as 1, 13,18, D3, E3, which must be completed in order for the interrupt INT1 to be considered fully processed. It should be noted that "A1" refers to the process "A" being performed by the order-1 handler 406 whereas "C3" refers to the process "C" being performed by the order-3 handler 408, and so on. Therefor, the order-1 interrupt handler 406 will process tasks "A" and "B" quickly, since, at least for this example, they represent time critical processes. Whereas, when the interrupt packet 410 is passed to the order-3 interrupt handler 508, the tasks "C", "D", and "E", are processed by the order-3 interrupt handler 408. In this way, the interrupt INT1 is fully processed by the cooperative effort of the order-1 interrupt handler 406 and the order-3 interrupt handler 408 as mediated by the interrupt packet 410 that is associated with the interrupt INT1 only. It should be noted that the same procedure is followed for the cooperative processing of the interrupt INT2.

A particular implementation of the invention will now be described with reference to FIGS. 5–8.

Figure 5:
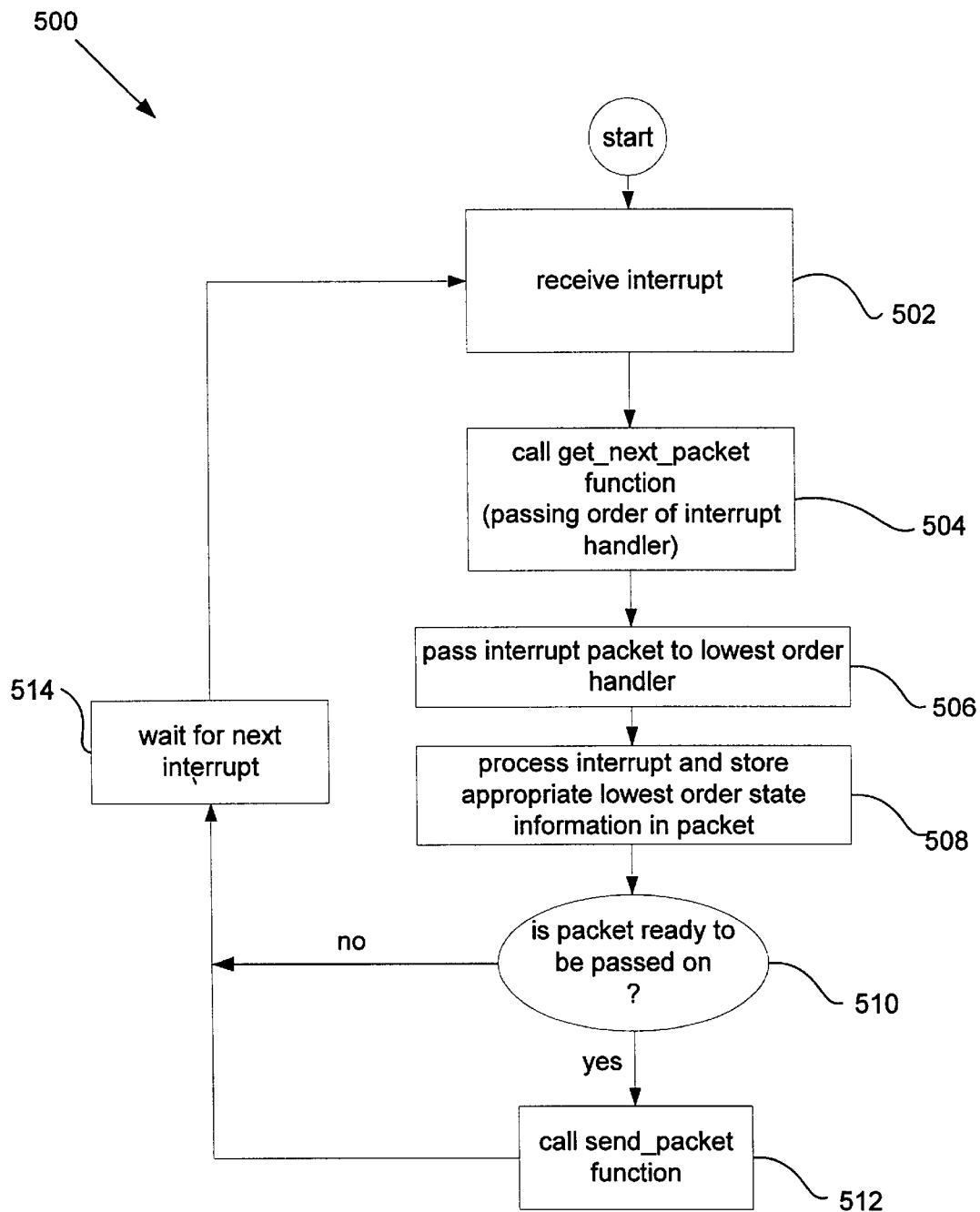
FIG. 5 is a flowchart detailing a possible process for handling device interrupts by a lowest order interrupt handler in accordance with an embodiment of the invention.

FIG. 5 is a flowchart detailing a possible process 500 for handling device interrupts by a lowest order interrupt handler in accordance with an embodiment of the invention. The process 500 begins at 502 when a device driver receives an interrupt from the device it is managing. Once the interrupt is received, the device driver calls a get_next_packet function at 504. Once the get_next packet function has been completed the get_next_packet is passed the order of the interrupt handler that wants the next packet and the fetched interrupt packet is passed to the lowest order handler at 506. By way of example, if the device driver includes an order-1 interrupt handler and an order-3 interrupt handler, then the interrupt packet is passed to the order-1 interrupt handler. Alternatively, if the device driver has only an order-3 interrupt handler, then the interrupt packet is passed from the microkernal directly to the order-3 handler. Once the interrupt packet has been passed to the lowest order interrupt handler, the interrupt handler processes the interrupt packet by, in one embodiment, storing appropriate lowest order state information in the interrupt packet at 508. Such state information includes information related to processing the interrupt associated with the interrupt packet. A particular example relates to a serial device driver having an array of characters that are read out of some hardware register by an order-1 interrupt handler. The order-1 interrupt handler in this case processes only these characters while the order-2 and order-3 interrupt handlers do further processing of the state information. A determination at 510 is then made regarding whether or not the interrupt packet is ready to be passed on. By passed on, it is meant that the interrupt packet is ready to be sent to the next interrupt handler.

If the determination at 510 is that the interrupt packet is ready to be passed on, then the device driver calls a send_packet function at 512. After the send_packet function has been completed, the process 500 waits at 514 for a next interrupt from the device being managed by the device driver. Alternatively, if it was determined at 510 that the interrupt packet was not ready to be passed on, then control is passed to 514 without calling the send_packet function until such time as a next interrupt is received from the device being managed by the device driver.

Figure 6:
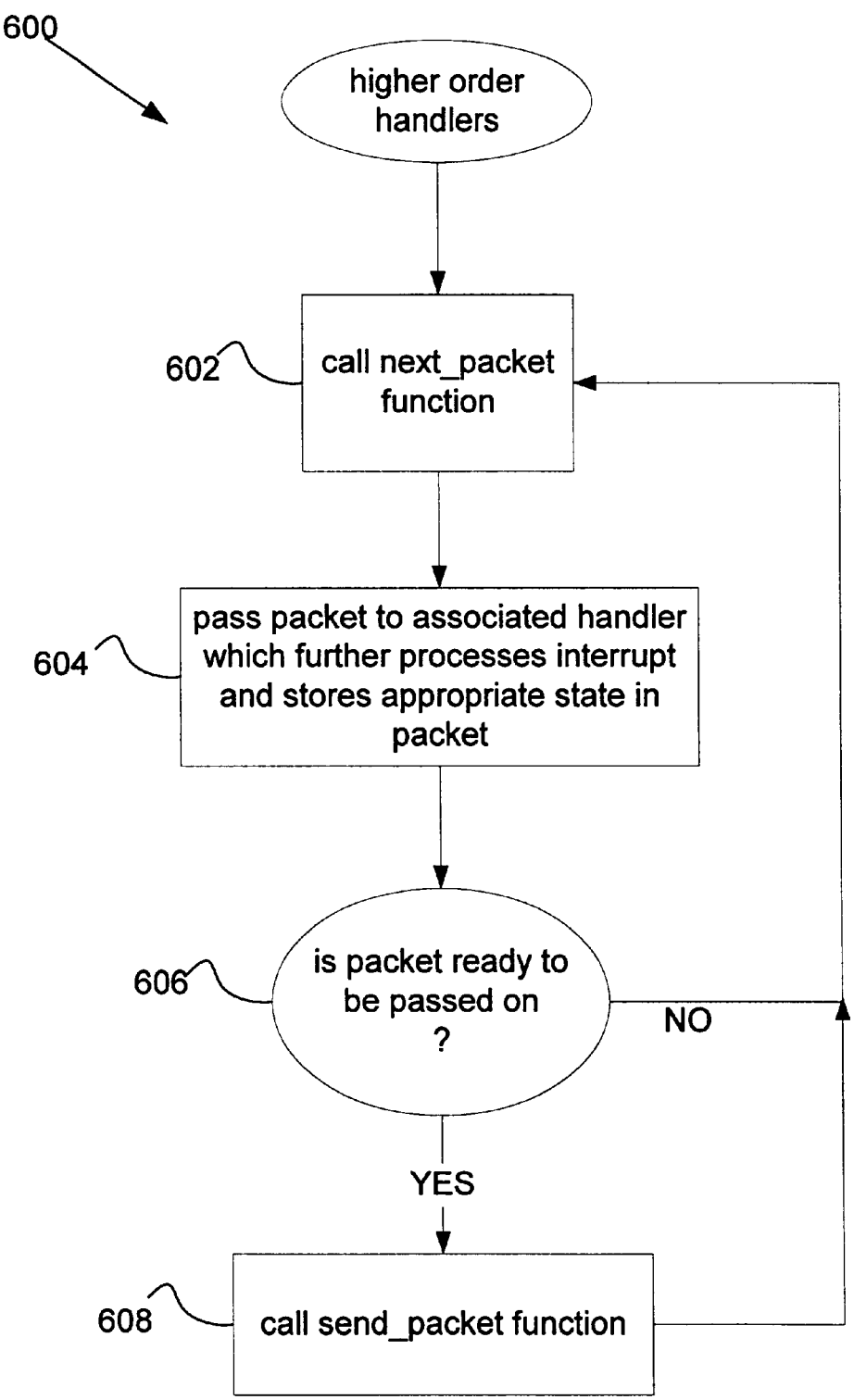
FIG. 6 is a flowchart detailing a possible process for handling device interrupts by a higher order interrupt handler in accordance with an embodiment of the invention.

FIG. 6 is a flowchart detailing a possible process 600 for handling device interrupts by a higher order interrupt handler in accordance with an embodiment of the invention. It should be noted that the process 600 is used in conjunction with the process 500 in those situations where interrupt handlers of more than one order have been instantiated. The process 600 begins at 602 by calling the get_next_packet function. Once the next packet has been obtained, the packet is passed to an associated higher order interrupt handler which further processes the packet, by for example, storing appropriate state data in appropriate data fields at 604. At 606, it is then determined whether or not the packet is ready to be passed on. If it is determined that the packet is not ready to be passed on, control is returned to 602 where the next packet function is called. On the other hand, if the packet is ready to be passed on, then the packet is passed on to a next appropriate interrupt handler by calling the send_packet function at 608.

Figure 7:
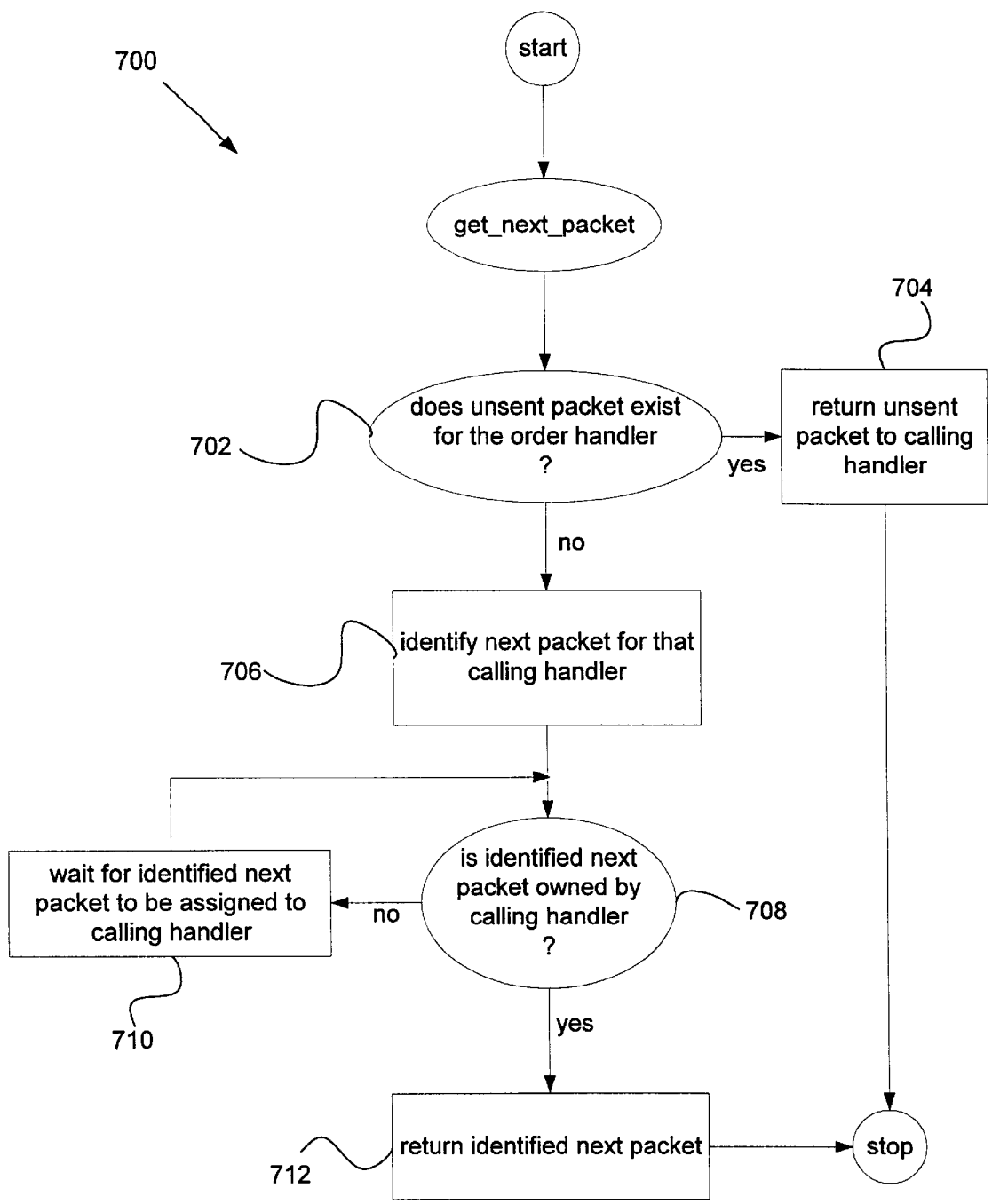
FIG. 7 is a flowchart detailing a possible process for getting a next interrupt packet in accordance with an embodiment of the invention.

FIG. 7 is a flowchart detailing a possible process 700 for getting a next interrupt packet in accordance with an embodiment of the invention. It should be noted that the process 700 is one particular implementation of the get_next_packet function at 504 of the process 500. The process 700 begins at 702 by a determination of whether or not an unsent interrupt packet exists for the current interrupt handler. If it is determined that there is an unsent interrupt packet, then the unsent interrupt packet is returned to the calling interrupt handler at 704. If, however, it is determined that there is no unsent interrupt packet, then the next interrupt packet for the calling interrupt handler is identified at 706. Once the next interrupt packet is identified, a determination at 708 is made whether or not the identified interrupt packet is owned by the calling interrupt handler. If it is determined that the identified next interrupt packet does not belong to the calling interrupt handler, then the process waits at 710 for the identified next interrupt packet to be assigned to the calling interrupt handler. If, however, it was determined at 708 that the identified next interrupt packet is owned by the calling handler, then the identified next interrupt packet is returned at 712. It should be noted, that in one implementation of the invention, an array of state variables is used.

Figure 8:
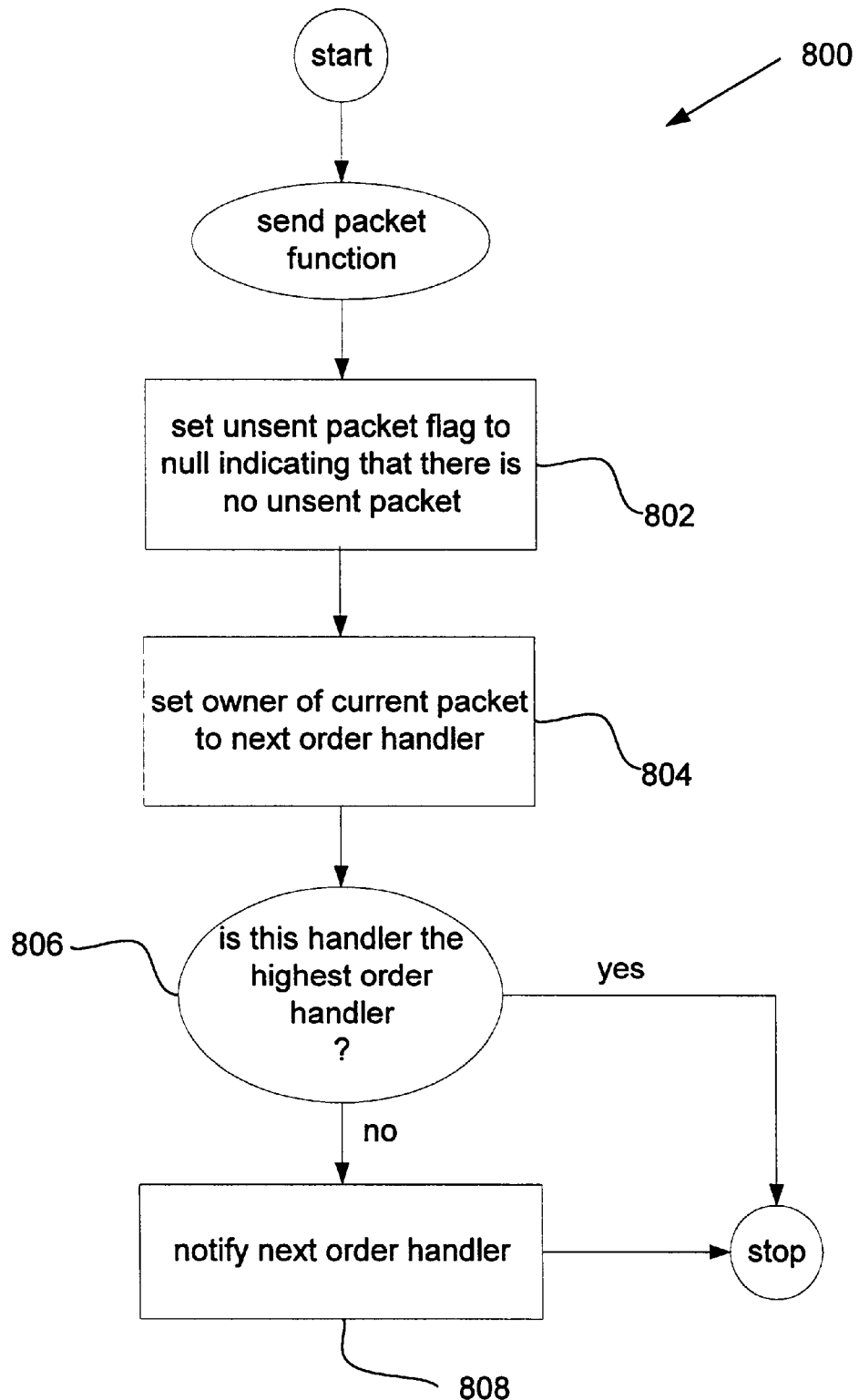
FIG. 8 is a flowchart detailing a process for sending a next interrupt packet in accordance with an embodiment of the invention.

FIG. 8 is a flowchart detailing a process 800 for sending a next interrupt packet in accordance with an embodiment of the invention. It should be noted that the process 800 is a particular implementation of the send_next_packet function at 508 of the process 500. The process 800 begins at 802 by setting an unsent packet flag in the interrupt packet to null indicating that there are no unsent packets. At 804, the current owner of the packet is set to a value corresponding to the next highest order handler available (which now becomes the current handler). At 806, a determination is made whether or not the current handler is now the highest order handler. If the current handler is now the highest order handler, then the process 800 stops. Otherwise, the next highest order handler available is notified at 808 after which the process 800 stops.

In one embodiment of the invention, the get_next_packet function and the send_next_packet function taken together manage the array of interrupt packets. In one particular implementation, the interrupt packets are managed as a ring buffer. One such ring buffer is configured in such a way that after a particular order interrupt handler has processed, for example, an interrupt packet p, the next interrupt packet that the particular interrupt handler will process is always the interrupt packet identified by the relation:

$$(p+1)(\text{modulo } N),$$

where N is the total number of interrupt packets.

Figure 9:
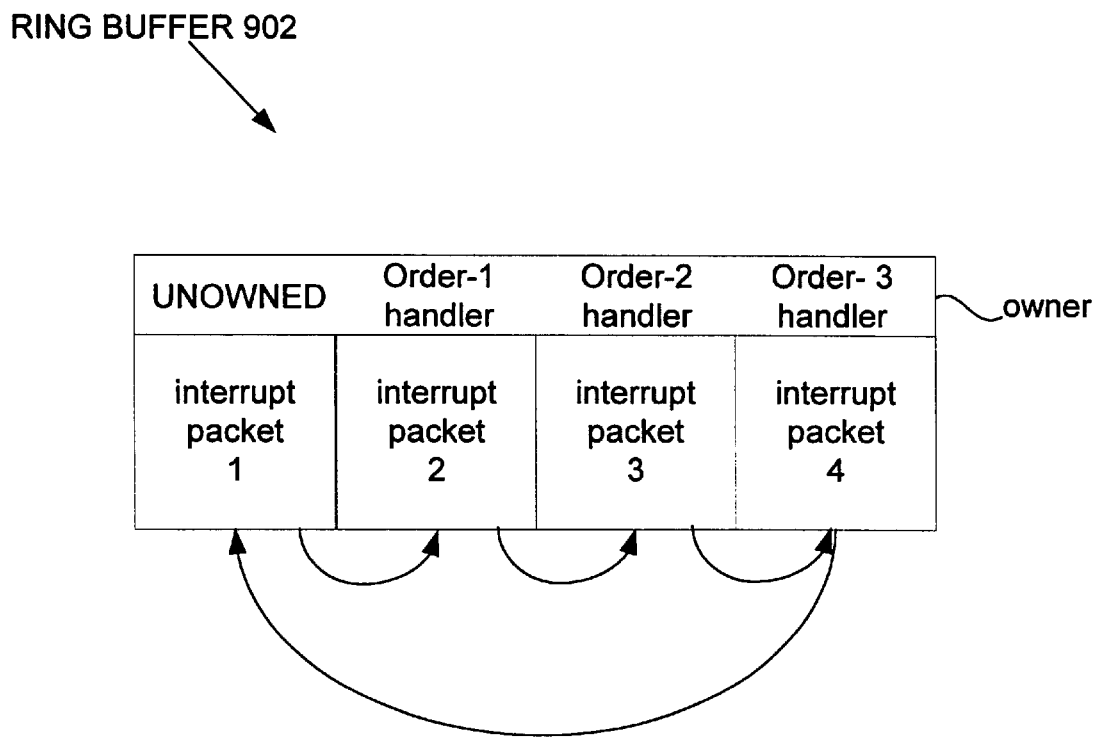
FIG. 9 shows a ring buffer in accordance with an embodiment of the invention.

Such a ring buffer arrangement is shown in FIG. 9. A ring buffer 902 contains 4 interrupt packets arranged between an order-1 handler, an order-2 handler, and order-3 handler, and as unowned.

Although only a few embodiments of the present invention have been described, it should be understood that the present invention may be embodied in many other specific forms without departing from the spirit or the scope of the present invention. Steps may also be removed or added without departing from the spirit or the scope of the present invention.

Figure 10:
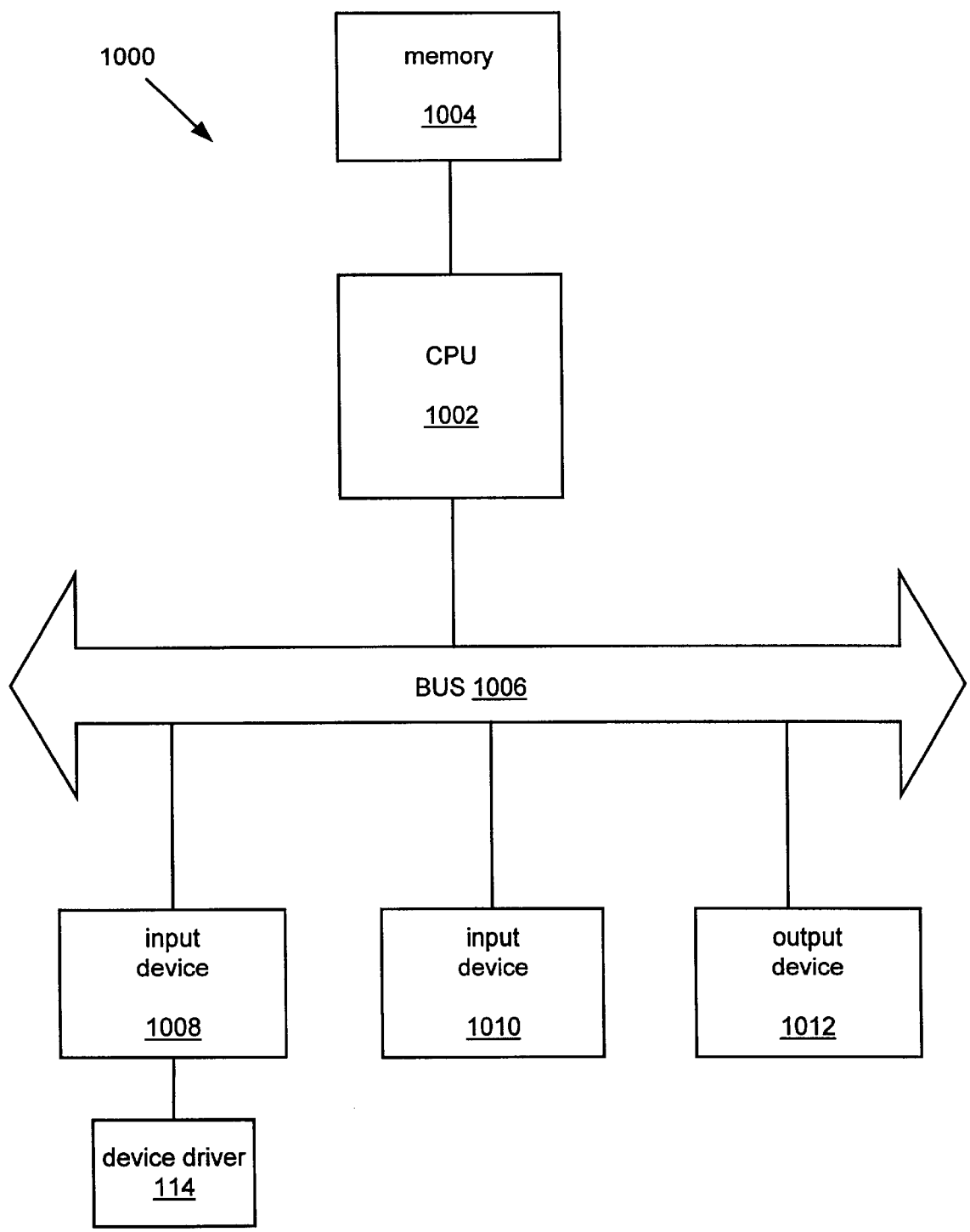
FIG. 10 is a representative computer system in accordance with an embodiment of the invention.

FIG. 10 illustrates a computer system 1000 in accordance with an embodiment of the invention. The computer system 1000 includes a central processing unit ("CPU") 1002, such as, for example, a Sun Microsystems SPARC, Motorola PowerPC, or Intel Pentium processor. CPU 1002 is coupled with a memory 1004 that includes any type of memory device used in a computer system, such as for example, random access memory ("RAM") and read-only memory ("ROM"). CPU 1002 is also coupled with a bus 1006, such as a PCI bus, or an S bus. A variety of input devices 1008 and 1010, and output devices 1012 are also coupled with bus 1006. Examples of such input and output devices include, but are not limited to, printers, monitors, modems, and/or network/telephone connections. Typically each of these devices has an associated with it a device driver. A device driver is an object-oriented program written to support an associated device coupled with computer system 1000. By way of example, the device driver 114 manages the input device 1008. Likewise, other device drivers can be utilized to support and manage any device, such as devices 1010 and 1012, coupled to the computer system 1000.

Although the methods of cooperative execution of native and non-native threads in a multi-threaded system in accordance with the present invention are particularly suitable for implementation with respect to a Java based environment, the methods may generally be applied in any suitable object-based environment. In particular, the methods are suitable for use in platform-independent object-based environments. It should be appreciated that the methods may also be implemented in some distributed object-oriented systems.

While the present invention has been described as being used with a computer system that has an associated virtual machine, it should be appreciated that the present invention may generally be implemented on any suitable object-oriented computer system. Specifically, the methods of passing interrupt packets with the present invention may generally be implemented in any multi-threaded, object-oriented system without departing from the spirit or the scope of the present invention. Therefore, the present examples are to be considered as illustrative and not restrictive, and the invention is not to be limited to the details given herein, but may be modified within the scope of the appended claims along with their full scope of equivalents.

What is claimed is:

1. A method of cooperatively processing a task in a multi-threaded computer system, comprising:
    using a first thread to partially process a task and store processing information relevant to further processing of the task in a packet;
    designating a second thread as the owner; and
    using the second thread to further process the task after the second thread has ownership of the packet, wherein the further processing by the second thread is based at least in part upon the processing information stored in the packet by the first thread, and wherein no synchronization primitives are required for the threads to cooperate in processing the task.

2. A method of cooperatively processing a task as recited in claim 1, wherein the second thread stores additional processing information in the packet and designates a third thread as the owner of the packet, the method further comprising:
    using the third thread to fiber process the task after the third thread has ownership of the packet, wherein the further processing by the third dread is based at least in part upon the processing information stored in the packet by the second thread.

3. A method as recited in claim 2, wherein the first thread is a higher priority thread than the second thread and the second thread is a higher priority thread than the third thread.

4. A method as recited in claim 2, wherein the task is interrupt handling, the threads execute different order interrupt handlers and the packet is an interrupt packet;
    the first thread is an order-1 interrupt handler that executes time critical code;
    the second thread is an order-2 interrupt handler that executes native code; and
    the third thread is an order-3 interrupt handler that executes non-native code.

5. A method as recited in claim 4, wherein the non-native code is JAVA bytecodes.

6. A method of cooperatively processing a task as recited in claim 1 or 2 wherein designating ownership of the packet is accomplished by updating an ownership field included in the packet.

7. A method as recited in claim 6, wherein each thread that participates in the processing of the task is arranged to set the ownership of the packet to the next thread to process the task and the final thread to process the task sets the ownership of the packet to no owner.

8. A method as recited in claim 1, wherein the first thread is a higher priority thread than the second thread.

9. A method as recited in claim 1, wherein the first thread is an order-1 interrupt handler designed to execute dime critical software.

10. A method as recited in claim 9, wherein the second thread is an order-2 interrupt handler that is a next higher order interrupt handler arranged to receive the interrupt packet sent by the order-1 interrupt handler when the second thread is to process the task.

11. A method of cooperatively processing an interrupt generated by a device using multiply ordered interrupt handlers in a multi-threaded computer system, wherein the multiply ordered interrupt handlers are included in a device driver used to manage the device, the method comprising:
    partially processing the interrupt using a first order interrupt handler, the first order interrupt handler being arranged to insert processing information into a packet and designate a second order interrupt handler as the owner of the packet; and
    partially processing the interrupt using the second order interrupt handler based at least in part on the processing information inserted in the packet by the first order interrupt handler, the second order interrupt handler being arranged to designate a new ownership of the packet upon completing second order interrupt processing; and
    wherein designating ownership of the packet is accomplished by updating an ownership field included in the packet.

12. A method of processing a interrupt as recited in claim 11, wherein the second order interrupt handler stores additional processing information in the packet and designates a third order interrupt handler as the owner of the packet upon completion of the processing by the second order interrupt handler, the method further comprising:

partially processing to interrupt using the third order interrupt handler based at least in part upon the additional processing information inserted in the packet by the second order interrupt handler, the third order interrupt handler being arranged to designate a new ownership of the packet upon completing third order interrupt processing.

13. A method as recited in claim 12, wherein the various interrupt handlers can only process the interrupt when they have ownership of the interrupt packet and wherein the final order interrupt handler to handle an interrupt designates the ownership of the packet as no owner.

14. A method as recited in claim 13, wherein the first order interrupt handler executes time critical native code, the second order interrupt handler executes native code, and the third order interrupt handles non-native code.

15. A method as recited in claim 14, wherein after a particular order interrupt handler that owns an interrupt packet p has partially processed the task, the next interrupt packet that the particular interrupt handler will own is the interrupt packet identified by the relation (p+1)(modulo N), where N is the total number of interrupt packets available to the particular interrupt handler.

16. An interrupt handler, comprising:

a plurality of different order interrupt handling components arranged to cooperatively process an interrupt in a serial fashion; and an interrupt packet that is accessible by the plurality of different order interrupt handling components and is arranged to pass processing information between interrupt handling components that includes an owner field arranged to store data indicative of the only one of the plurality of interrupt handlings components currently owning the interrupt packet such that the currently owning interrput handling component is the only component currently enabled to process the interrupt, wherein a first order interrupt handler is arranged to receive the interrupt, partially process the interrupt and pass the partially processed interrupt to a second order interrupt handler that further processes the interrupt.

17. An interrupt handler as recited in claim 16 wherein the second order interrupt handler is arranged to pass the further processed interrupt to a third order interrupt handler that further processes the interrupt.

* * * * *

UNITED STATES PATENT AND TRADEMARK OFFICE
CERTIFICATE OF CORRECTION

PATENT NO.   : 6,738,846 B1
DATED        : May 18, 2004
INVENTOR(S)  : Slaughter et al.

It is certified that error appears in the above-identified patent and that said Letters Patent is hereby corrected as shown below:

Column 12,
Line 9, "to fiber process" should read -- to further process --
Line 11, "the third dread" should read -- the third thread --
Line 41, "to execute dime" should read -- to execute time --

Column 13,
Line 7, "processing to interrupt" should read -- processing the interrupt --
Line 13, "interrupt handlings" should read -- interrupt handling --
Line 15, "owning interrput handling" should read -- owning interrupt handling --

Signed and Sealed this

Tenth Day of August, 2004

JON W. DUDAS
*Acting Director of the United States Patent and Trademark Office*